United States Patent Office 3,468,716
Patented Sept. 23, 1969

3,468,716
ORGANIC ELECTROLYTE ELECTROCHEMICAL SYSTEM
Morris Eisenberg, Palo Alto, Calif., assignor to Electrochimica Corporation, Menlo Park, Calif.
No Drawing. Filed Oct. 24, 1965, Ser. No. 505,025
Int. Cl. H01m *17/00*
U.S. Cl. 136—100                                12 Claims

ABSTRACT OF THE DISCLOSURE

An electrochemical system capable of employing highly active electrode materials, such as a cell employing an anode fabricated of an element less noble than zinc or an electrodepositing device wherein the material to be deposited at the cathode thereof comprises an element less noble than zinc, wherein the electrolyte comprises (1) a pentacyclic ester and (2) a second organic compound selected from the group consisting of aliphatic and cyclic ethers, nitroparaffins, cyclic ketones and aliphatic nitriles; and in a preferred embodiment, such electrolyte combined with a solute such as a Lewis acid.

---

This invention relates to an electrochemical system such as a galvanic cell or battery and to electrodeposition; and more particularly to electrochemical systems which employ a mixture of organic solvents for the electrolyte.

Galvanic cells employing aqueous electrolytes, i.e., solutions of salts dissolved in water, have been widely used for many years for storing chemical energy which can be converted directly into electrical energy. Strong dielectric properties of the aqueous solvent are material in achieving an electrolytic dissociation of the dissolved salts so that electrically conducting solutions will be obtained by virtue of ion formation. However, aqueous solutions are only effective when combined with a limited number of electrode materials. The reason for this is that when the potential difference between the electrodes, i.e., the cathode and the anode, is great, i.e., when the electromotive force developed exceeds, for example, 1.6 to 2.1 volts, an aqueous electrolyte will undergo electrolysis and decompose. This, coupled with the instability of such highly active electrode materials in the presence of aqueous solutions, has heretofore greatly limited the number of materials available for electrode fabrication.

In an effort to overcome these disadvantages of aqueous electrolytes, certain non-aqueous electrolytes have been employed; see for example U.S. Patent No. 3,098,-770, issued July 23, 1963, where nitriles or ketones are utilized in combination with solutes such as certain Lewis acids-electron acceptors, as substantially anhydrous electrolytes.

Broadly stated, the present invention, as set forth in greater detail below, provides an improved anhydrous electrolyte for primary electrolytic cells. In another aspect, the invention allows a greater selection of highly active electrode materials to be employed in the electrolytic system. These aspects of the invention will be better understood and other objects will be more apparent from the description of the invention as given hereinafter.

Now, in accordance with this invention, it has now been found that a highly useful electrochemical system is obtained by employing an electrolyte comprising as a solvent (1) a pentacyclic ester and (2) a second organic compound selected from the group consisting of aliphatic and cyclic ethers, nitroparaffins, cyclic ketones and aliphatic nitriles. By employing such a mixture of solvents, especially when combined with a solute such as a Lewis acid, a large number of electrode materials, possessing high electrochemical potentials, and heretofore not suitable for incorporation with an aqueous electrochemical system, can be beneficially employed.

For convenience, the various metal electrodes which are employed in the present invention as electron donors, will be termed "anodes" because these metals, when involved with the reaction of the electrochemical system, in effect, donate electrons. Broadly, any metal having a low electronegativity or a comparatively low ionization potential can be employed as the anode (electron donor) in the present invention. By this it is meant to include metals which are less noble than zinc. Metals included in this definition are tellurium, manganese, uranium, beryllium, aluminum, magnesium, sodium, calcium, barium, strontium, potassium, rubidium and lithium, with lithium being especially preferred.

The term "cathode" is meant to include those electrodes in the present invention which act as electron acceptors, i.e., electrodes which accept electrons during operation of the electrochemical system described herein. In general, such electrodes are prepared from the halides of copper, nickel, silver, cobalt and iron, and more particularly, those metal halides wherein the halogen has an atomic number of from 9–35, inclusive, i.e., fluorine, chlorine and bromine. The most preferred cathode is formed from the chlorides of the above mentioned metals. Silver chloride and copper chloride are especially effective.

However, these metal halides, the active component of the cathode, are by themselves poor electrical conductors. It is, therefore, usually necessary to combine the halides with conductive materials such as powdered copper, powdered silver, powdered nickel or various forms of finely divided carbon, such as graphite, flaked carbon, acetylene black and the like. Such conductive materials may be mixed with the metal halide in a suitable manner using known techniques while maintaining the non-aqueous characteristics of the mixture.

The term "pentacyclic esters" includes those heterocyclic five-membered organic compounds wherein at least one of the ring members is oxygen and which have relatively high dielectric constant and stability. Such pentacyclic esters include ethylene carbonate, propylene carbonate γ-butyrolactone, γ-valerolactone and the like.

These pentacyclic esters are particularly effective in dissolving a large variety of both ionic and covalent compounds to form solutions which are very conductive. However, more concentrated solutions of these esters exhibit a relatively high viscosity which results in electrical conductances less favorable than with corresponding aqueous solution having much lower viscosities. Additionally, pentacyclic esters tend to dissolve an excessive amount of certain of the most promising cathodic reactant materials, such as silver chloride and copper chloride. Such solubility of the cathodic materials must be avoided as even a gradual diffusion of small amounts of the metal ions, such as $Ag^+$ and $Cu^{++}$, towards the anode will result in a so-called "cementation" reaction whereby the anode metal exchanges position with the cathodic reactant in solution, thereby causing an undesirable self-discharging and early failure of the battery.

These undesirable secondary effects which result from the use of pentacyclic esters as the solvent have been obviated by incorporating at least one member of a very limited grouping of secondary organic solvents which have low viscosities and relatively good solvent powers for the covalent compounds employed as solutes, and described hereinafter, while negating the undesirable solubility of the cathode materials in the cyclic esters.

This second grouping of solvents includes aliphatic ethers, cyclic ethers, nitroparaffins, cyclic ketones, and aliphatic nitriles.

The aliphatic ethers include those having lower molecular weight alkyl groups therein. By this is meant those ethers having alkyl groups of from one to five carbon atoms and preferably 2–3 carbon atoms. Examples of such materials include diethyl ether, ethylpropyl ether, n-propyl ether, iso-propyl ether, n-butyl ether and the like.

The cyclic ethers of this invention include those having from 3–10 carbon atoms and preferably 4–5 carbon atoms. Typical of such cyclic ethers are tetrahydrofuran and tetrahydropyran.

The nitroparaffins include those nitrocompounds wherein the $NO_2$ radical is attached to an alkyl group of from 1–5 carbon atoms. Advantages have been found to result from the use of, for example, nitromethane, nitroethane, 1-nitropropane, 2-nitropropane, and the like.

The cyclic ketones include those having from 2–7 carbons and preferably 3–5 carbons. Most preferred in this grouping are those having an odd number of carbon atoms, especially cyclopropanone and cyclopentanone.

The aliphatic nitriles are preferably also of the lower molecular weight alkyl type which includes, for example, propionitrile, butyronitrile, valeonitrile and other corresponding nitriles containing an alkyl group of from 2–5 carbon atoms.

The volume of pentacyclic ester employed may be varied from 10 to 90% of the total volume, and preferably from 30 to 60% of the total volume.

In a very important additional aspect, it will be seen that the exceptionally broad liquid range of the cyclic esters, especially when combined with the members of the second solvent grouping, produces a battery which will be capable of operating over a wide temperature range. Furthermore, this combination of solvents substantially lowers the vapor pressure of the electrolytic sytem. The carefully chosen combinations of the solvents should lead to rather uniquely advantageous properties for high energy battery applications.

It has been found that the choice of solute must be such that in combination with the aforementioned mixture of solvents, the resulting electrolytic solution (1) will have a conductance as high as possible and at least as high as $1 \times 10^{-3}$ mhos per centimeter at room temperature, and preferably $5 \times 10^{-3}$ mhos per centimeter; (2) would not spontaneously attack, to any appreciable degree, the anodes having high oxidation potentials, i.e., lithium, sodium, calcium and the like; and (3) would not dissolve the cathode materials to such an extent that the aforementioned self-discharge (cementation) of the cell would become appreciable.

Therefore, the solutes referred to herein are those Lewis acids, inorganic and organic, which are compatible with the selected solvents and are further capable of acting as electron acceptors. According to the Lewis or electronic concept of acids and bases, many substances which contain no active (ionizable) hydrogen can act as acids and do not enter into a neutralization reaction. The basic concept was set forth in the chemical literature, i.e., Lewis, G. N., JACS 46, 2027 (1924).

Typical Lewis acids suitable herein include $AlF_3$, $AlCl_3$, $AlBr_3$, $BF_3$, $BCl_3$, $BBr_3$ and $PF_5$. Certain coordination compounds can be coupled with these Lewis acids to form relatively highly conductive and stable solute solutions. These include LiF, LiCl, LiBr, NaF, NaCl, NaBr, KF, KCl and KBr.

These Lewis acids, with or without the coordination compounds, form soluble ionic complexes with the aforementioned cyclic esters, and are especially effective when employed with the additional solvent selected from the aliphatic ethers, cyclic ethers, nitroparaffins, cyclic ketones, and aliphatic nitriles hereinbefore described.

In addition, it has been found that certain simple salts, such as the perchlorates, for example, $LiClO_4$, ranging in concentration from 0.5–1.5 M per liter, may be additionally employed as solutes in the aforementioned novel solvent mixtures to provide satisfactory electrolytes. These aforementioned concentration ranges of $LiClO_4$ may be used with $AlCl_3$ or LiCl, in concentrations ranging from about 0.5–1.5 M per liter, to form the complexing agent solute in the novel solvent mixture.

The solute concentrations may be varied within wide limits without significant effect on the overall performance of the electrolytic system. This is most clearly illustrated by the following table wherein the different ratios of the Lewis acids, $AlCl_3$ and LiCl, were tested for the resulting specific conductance.

TABLE.— SOLVENT MIXTURES USED IN VARIOUS ELECTROLYTE SOLUTIONS (LEWIS ACIDS) AND RESULTING SPECIFIC CONDUCTANCE

| Solvent system (volume percent) | Lewis acid Molal concentrations | | Ratio, LiCl/ $AlCl_3$ | Spec. Cond., $\times 10^{-3}$ mhos/cm. |
|---|---|---|---|---|
| | LiCl | $AlCl_3$ | | |
| 100 PC | 0.75 | 0.75 | 1.00 | 4.8 |
| 50 PC–50 THF | 0.75 | 0.75 | 1.00 | 5.3 |
| 50 PC–50 THF | 0.75 | 1.0 | 0.75 | 8.0 |
| 75 PC–25 THF | 0.75 | 1.0 | 0.75 | 5.2 |
| 25 PC–75 NM | 0 | 3.00 | 0 | 11 |
| 25 PC–75 NM | 0.12 | 3.00 | 0.04 | 12 |
| 25 PC–75 NM | 0.18 | 3.00 | 0.06 | 16 |
| 33 PC–64 NE | 0.15 | 3.00 | 0.05 | 4 |
| 100 BL | 0.75 | 1.00 | 0.75 | 7.8 |
| 50 BL–50 THF | 0.75 | 1.00 | 0.75 | 8.8 |
| 50 BL–50 DE | 0.75 | 1.00 | 0.75 | 7.5 |
| 25 BL–75 NM | 0.50 | 3.00 | 1.167 | 22 |
| 20 PC–60 NM–20 THF | 0.15 | 3.00 | 0.05 | 15 |

PC—propylene carbonate (Group 1), BL—gamma butyrolactone (Group 1), NM—nitromethane (Group 2), THF—tetrahydrofuran (Group 2), NE—nitroethane (Group 2), DE—diethyl ether (Group 2).

As an additional feature of the instant invention, the novel solvent mixtures can be employed for electrodeposition. By this is meant that electrodes can be formed which have a relatively high degree of purity by depositing in a highly porous form the desired electrode material on an electrode supporting screen immersed in the electrolyte disclosed herein. Thereafter, by appling slight pressure to the porous pure spongy screen-supported deposit, an electrode is formed having any desired porosity and pore surface to provide a relatively high current-carrying capacity within a small apparent electrode area.

Separators for cells embodying the instant invention preferably are selected to provide physical separation and electrical contact between the respective anodes and cathodes, as well as to limit penetration of the cathodic material towards the anode where its reaction would affect the life and capacity of the cell. In addition, with the organic electrolytes herein disclosed, the materials from which the separators are made should be relatively inert to the particular organic solvent. Woven and non-woven fabrics, cross-linked, irradiated films and perforated sheets made of substances such as polyethylene, polypropylene, Fiberglas, filter paper, cellulosic felts, and the like which preferably do not swell when in contact with the electrolyte have been found to be satisfactory.

Cell enclosure surfaces should be fabricated out of materials which are relatively inert to the electrolytes with which they are in contact. Polymers such as polyethylene, polypropylene, proxi-glass laminates and fluorinated hydrocarbon resins, are acceptable materials; metal cases may also be employed such as stainless steel, aluminum, nickel, or suitably plated materials. When a metal case is used, insulation will be required internally at the back of the pack or the anodes of the battery pack may be connected to the case (which then constitutes the negative terminal), while the cathodes must be carefully connected through a separate insulated positive terminal. The battery terminals, or the terminals for an electrodeposition system, should be made of metals which will not be attacked by the electrolyte nor give rise to local action. Thus, the terminals for the cathodes should be made of a metal which, while formerly less active on the electrochemical scale, behaves passively. Aluminum, nickel, or nickel-plated terminals are examples of metal satisfying this requirement.

To further illustrate the novel composition of this invention the following are examples of electrochemical systems embodying my invention. It should be understood that the details thereof are for purposes of illustration only and are not intended to prescribe specific limitations of my invention.

Example I

A set of lithium anodes each supported between a folded packet-like 150 mesh screen, made of very thin wire is interspersed with cupric chloride cathodes. The cathode consists of two layers of spot-welded twenty mesh copper screen onto which a cathode mix, containing 85% $CuCl_2$ powder, 10% acetylene black and 5% silver flake with a fraction of a percent of polyethylene binder is pressed on. Two layers of a thin non-calendered polypropylene separator are positioned between each anode and the cathode.

The electrodes and separators are formed in a pack with the cathodes attached to one nickel terminal and the anodes to another nickel terminal. The pack is inserted into an inert plastic case made of epoxy, and the cell is filled in an inert dry-atmosphere box with an electrolyte comprising, by volume, 60% nitromethane and 40% propylene carbonate, containing 3 moles per liter of aluminum chloride and 0.3 mole per liter of lithium chloride. Open circuit voltage at an ambient temperature of 20° C. was found to be 3.15 volts. Upon application of a load current corresponding to a current density of 10 ma./cm.$^2$, the initial voltage was 2.4 volts. Continuous discharge at this current density to a 1 volt cut-off point yielded 85% Faradaic efficiency for the cathodic reactant material, $CuCl_2$, originally present and 60% Faradaic efficiency for the lithium material present in the anodes in the cell.

Example II

An electrolyte solution is prepared, comprising by volume, 70% nitromethane, 20% propylene carbonate and 10% tetrahydrofuran in which there is then dissolved 2 moles per liter of $AgCl_3$ and 1.5 moles per liter of LiCl. A soluble lithium anode is formed by securing a thin slab of solid lithium metal to a 20 mesh nickel screen which provides both mechanical support and electrical conductance through the anode. A cathode is selected of nickel screen, but such screen may be replaced by solid, perforated or expanded metal formed from copper, silver, gold or the like.

The electrolyte solution is poured into a conventional plating tank. The anode, handled in a protected environment, and the cathode are then immersed in the tank facing each other through about a 1″ to 2″ separation of electrolyte. The lithium anode is then connected to the positive side, the cathode to the negative, of an electrolyzing circuit. Approximately 10 to 20 v. D.C. is applied at a current density of 10 ma./cm.$^2$, of apparent cathode area. Mechanical agitation is applied to the system. This may also be provided by bubbling argon gas through the bath. Electrodeposition was continued until there was a sufficient deposit of lithium, to form, upon removal and pressing, a 30% to 60% porosity lithium electrode on the cathode screen.

The rate of current density may be varied from 0.5 to 100 ma./cm.$^2$, and the duration of electrodepositing may be varied to obtain a predetermined amount of lithium metal at the cathode.

Example III

A porous lithium anode is prepared in accordance with Example II above. A cathode is fabricated from a mixture having, by weight, 80% cupric chloride, 10% carbon black, 10% copper powder, and an amount of polyethylene binder equal to about 2% of the total weight of the mix. The aforementioned mixture is held on a grid consisting of three layers of copper mesh screens spotwelded together. The cathode and anode are arranged to form an electrode assembly having a layer of non-woven cellulosic separator material between the electrodes.

The electrode assembly is then inserted into a polypropylene container. The container is next filled with a mixture having, by volume, 50% γ-butyrolactone, 25% nitromethane, and 25% tetrahydrofuran, and containing in solution 2.5 moles per liter of $AlCl_3$ and 0.2 mole per liter of LiCl. Open circuit voltage of the cell was found to be 3.14 volts. Upon application of 2 ma./cm.$^2$ discharge current density, the initial voltage was 2.6 volts; after discharge to 1 volt cut-off point, the Faradaic efficiency for the active cathode material was found to be 85% and that for the anode 50%.

Although the foregoing specification is set forth in some detail in respect to its various aspects, it is understood that numerous other variations of the invention may be practiced within the spirit thereof and scope of the appended claims.

What is claimed is:

1. An electrochemical system comprising an anode, cathode and a substantially anhydrous electrolyte for electrolytic conduction between said anode and cathode, said electrolyte comprising a pentacyclic ester and at least one solvent selected from the group consisting of aliphatic ethers, cyclic ethers, nitroparaffins, cyclic ketones, and aliphatic nitriles.

2. A system in accordance with claim 1 wherein the electrolyte additionally comprises a solute in an amount sufficient to provide said electrolyte with an electronic conductivity of at least $1 \times 10^{-3}$ mhos per centimeter.

3. A system in accordance with claim 2 wherein the solute is a Lewis acid selected from the group consisting of aluminum trichloride, aluminum trifluoride, boron trichloride, boron trifluoride, aluminum tribromide, boron tribromide, and potassium pentafluoride.

4. A system in accordance with claim 3 wherein the solute additionally comprises a coordinating compound selected from the group consisting of LiF, LiCl, LiBr, NaF, NaCl, NaBr, KF, KCl, and KBr.

5. A system in accordance with claim 1 wherein the anode is an element less noble than zinc.

6. A system in accordance with claim 5 wherein the anode is lithium.

7. A system in accordance with claim 1 wherein the cathode is a metal halogen wherein the metal is selected from the group consisting of copper, nickel, silver, cobalt and iron.

8. A system in accordance with claim 7 wherein the halide has an atomic number of from 9–35, inclusive.

9. A system in accordance with claim 8 wherein the cathode is copper-copper chloride.

10. A system in accordance with claim 7 wherein the cathode additionally comprises a conductive material selected from the group consisting of copper, silver, nickel and carbon.

11. A system in accordance with claim 1 wherein the pentacyclic ester is γ-butyrolactone and the second solvent is nitromethane and tetrahydrofuran.

12. A system in accordance with claim 1 wherein the pentacyclic ester is propylene carbonate and the second solvent is nitromethane.

References Cited

UNITED STATES PATENTS

| | | | |
|---|---|---|---|
| 3,073,884 | 1/1963 | Pinkerton | 136—137 XR |
| 3,098,770 | 6/1963 | Horowitz et al. | 136—153 XR |
| 3,185,590 | 5/1965 | Mayer et al. | 136—153 XR |

WINSTON A. DOUGLAS, Primary Examiner

D. L. WALTON, Assistant Examiner

U.S. Cl. X.R.

136—154, 155; 204—24, 35, 105, 248